Sept. 3, 1968 G. W. JOHNSON, JR., ET AL 3,399,477
REFLECTORIZED INDICIA
Filed Dec. 30, 1964 5 Sheets-Sheet 1

Inventors
Glenn W. Johnson, Jr., Sidney A. Heenan,
Joseph A. Ciccolella & Carman R. Hintz.
By Prangley, Baird, Clayton, Miller & Vogel.
Attys.

Sept. 3, 1968  G. W. JOHNSON, JR., ET AL  3,399,477
REFLECTORIZED INDICIA

Filed Dec. 30, 1964  5 Sheets-Sheet 2

Inventors
Glenn W. Johnson, Jr., Sidney A. Heenan,
Joseph A. Ciccolella & Carman R. Hintz.
BY
Prangley, Baird, Clayton, Miller & Vogel.
Attys.

Sept. 3, 1968   G. W. JOHNSON, JR., ET AL   3,399,477
REFLECTORIZED INDICIA
Filed Dec. 30, 1964   5 Sheets-Sheet 3

Inventor
Glenn W. Johnson, Jr.,
Sidney A. Heenan,
Joseph A. Ciccolella &
Carman R. Hintz.

BY Prangley, Baird, Clayton, Miller & Vogel.
Attys.

Inventors
Glenn W. Johnson, Jr., Sidney A. Heenan,
Joseph A. Ciccolella & Carman R. Hintz.

United States Patent Office 3,399,477
Patented Sept. 3, 1968

3,399,477
REFLECTORIZED INDICIA
Glenn W. Johnson, Jr., Summit, N.J., Sidney A. Heenan, Park Ridge, Ill., and Joseph A. Ciccolella, Summit, and Carman R. Hintz, Englewood, N.J., assignors to Elastic Stop Nut Corporation of America, Union, N.J., a corporation of New Jersey
Filed Dec. 30, 1964, Ser. No. 422,334
16 Claims. (Cl. 40—130)

ABSTRACT OF THE DISCLOSURE

There is disclosed a reflectorized indicium comprising a metallic body having a plurality of reflector receiving openings therein arranged in the general shape of the indicium and having a corresponding plurality of reflex reflectors mounted in each of the openings in the body, each of the reflectors being formed of a synthetic organic resin. Each reflector includes an annular side wall having an outer periphery complementary to the associated body opening, a front wall integral with the side wall and closing the same, and a plurality of cube corner reflector elements on the rear surface of the front wall. Each reflector is mounted on the body by the cooperation of an outwardly directed rear retaining flange integral with the reflector and an outwardly directed front flange swedged, by ultrasonic heating, from the forward portion of the side wall. Orientation structure, in the form of a pair of projections extending inwardly from the periphery of the opening and extending into grooves in the side wall of the reflector, is provided so as to prevent rotation of the mounted reflector.

---

This invention relates to reflectorized indicia and methods of making the same, and particularly reflectorized indicia useful along roadways for directing traffic and conveying useful information.

In accordance with the present invention, the reflectorized indicia are of the type which include a body in the general shape of a letter, numeral, symbol or other device, and are provided with a plurality of reflector receiving openings therein also arranged in the general shape of a letter, numeral, symbol, or other device. Such reflectorized indicia are utilized in forming signs that are placed along roadways traveled by vehicles carrying forwardly directed lights, such for example, as automobile highways, airport runways, and the like, the signs being useful for imparting information and directions to the operators of the vehicles.

The signs are more particularly formed by mounting the reflectorized indicia on a suitable support. It has been customary heretofore only loosely and temporarily to secure the reflectors in the associated body openings, such as by friction tape, prior to the mounting of the indicia on an associated support. Such securing of the reflectors on the body is not entirely satisfactory since relatively minor forces can remove the reflectors from the body prior to the mounting of the body on the support, whereby the reflectors became lost or damaged. After the mounting of the body with the reflectors therein upon a support, the securing tapes were removed or became worn, whereby the reflectors were free to fall from the body should the body and the associated support become sufficiently separated to permit the reflectors to fall therebetween.

It also has been customary heretofore randomly to orient the optical axes of the reflectors with respect to the body, and further to provide reflectors of the "split face" type so that the random orientation of the reflectors on the body will always provide a few reflectors that are oriented to give an adequate signal when lighted by a vehicle light. However, the illumination of various portions of each indicia may not be uniform since certain of the reflectors may be oriented in an optimum reflecting position whereby to provide a bright area, whereas other reflectors may be oriented in a minimum reflecting position whereby to provide a dark area.

Accordingly, it is an important object of the present invention to provide improved reflectorized indicia of the type set forth wherein the reflectors are mounted in a permanent manner upon the body of the indicia within the associated reflector receiving openings therein.

It is another object of the invention to provide improved reflectorized indicia wherein the reflectors are mounted on the bodies in the associated body openings in a loose and trapped condition so that thermal changes in the dimensions of the bodies about the openings have no effect upon the dimensions and optical properties of the reflectors.

In connection with the foregoing object, another object of the invention is to provide indicia wherein the bodies are formed of a metal such as aluminum and the reflectors are formed of a synthetic organic plastic resin such as methacrylate resin, the mounting of the reflectors on the bodies being such that the relatively large thermal change in dimensions of the metal body are not transmitted to the reflectors although the reflectors are substantially permanently mounted upon the bodies.

Yet another object of the invention is to provide improved reflectorized indicia of the type set forth wherein each reflector includes an annular side wall that is disposed in the associated body opening and has an outer periphery shaped complementarily thereto, the side wall having an outwardly directed retaining flange behind the body and an outwardly directed front flange in front of the body, the facing surfaces of the flanges being spaced apart a distance greater than the thickness of the body, and the outer side wall being spaced from the periphery of the reflector opening to provide the loose and trapped mounting of the reflector on the body.

In connection with the foregoing object, another object of the invention is to provide an improved reflectorized indicium of the type set forth wherein the front flange is formed integral with the reflector side wall, and more specifically, is swedged therefrom after ultrasonic heating thereof.

Still another object of the invention is to provide an improved reflectorized indicia of the type set forth wherein the reflector has a front wall closing the forward portion of the side wall and carrying reflector elements of the cube corner type on the rear thereof, and wherein a back sheet is provided sealing the rear portion of the side wall to preserve unimpaired the optical properties of the cube corner reflectors.

In connection with the foregoing object, another object of the invention is to provide an improved reflectorized indicium of the type set forth wherein the back sheet is sealed to the side wall by an ultrasonic weld.

Yet another object of the invention is to provide an improved reflectorized indicium utilizing reflectors of the cube corner type, wherein all of the cube corner reflecting elements on the indicium are oriented in a predetermined manner to provide for optimum reflecting action therefrom, all while maintaining the loose and trapped mounting of the reflectors with respect to the associated bodies.

Still another object of the invention is to provide an improved reflectorized indicium of the type set forth wherein cooperating projection and groove structures are provided between the body and the reflectors mounted thereon to preserve the desired orientation of the reflectors, the projections preferably being on the periphery of the openings in the body and projecting into grooves in the side walls of the reflectors.

A further object of the invention is to provide an improved reflectorized indicium of the type set forth utilizing cube corner reflecting elements therein, wherein all of the cube corner reflecting elements are oriented in the same direction, and specifically are edge oriented with respect to an incident ray of light when the indicium is in the operative position thereof.

A further object of the invention is to provide improved reflectorizing indicia of the type set forth which are specifically designed to provide maximum reflection when disposed to the right of or to the left of or above an associated roadway.

A still further object of the invention is to provide improved reflectorized indicia of the type set forth wherein each of the reflectors has an orientation tab on the forward portion thereof and having a predetermined position with respect to the cube corner reflecting elements thereon for use in orienting the reflectors with respect to the associated body during the assembly thereof.

A still further object of the invention is to provide improved methods of making reflectorized indicia of the type set forth.

Further features of the invention pertain to the particular arrangement of parts whereby the above-outlined and additional operating features thereof are attained.

The invention, both as to its organization and method of operation, together with further objects and advantages thereof, will best be understood by reference to the following specification taken in connection with the accompanying drawings, in which:

Figures 1, 2, 3, 23A, 23B, 23C:
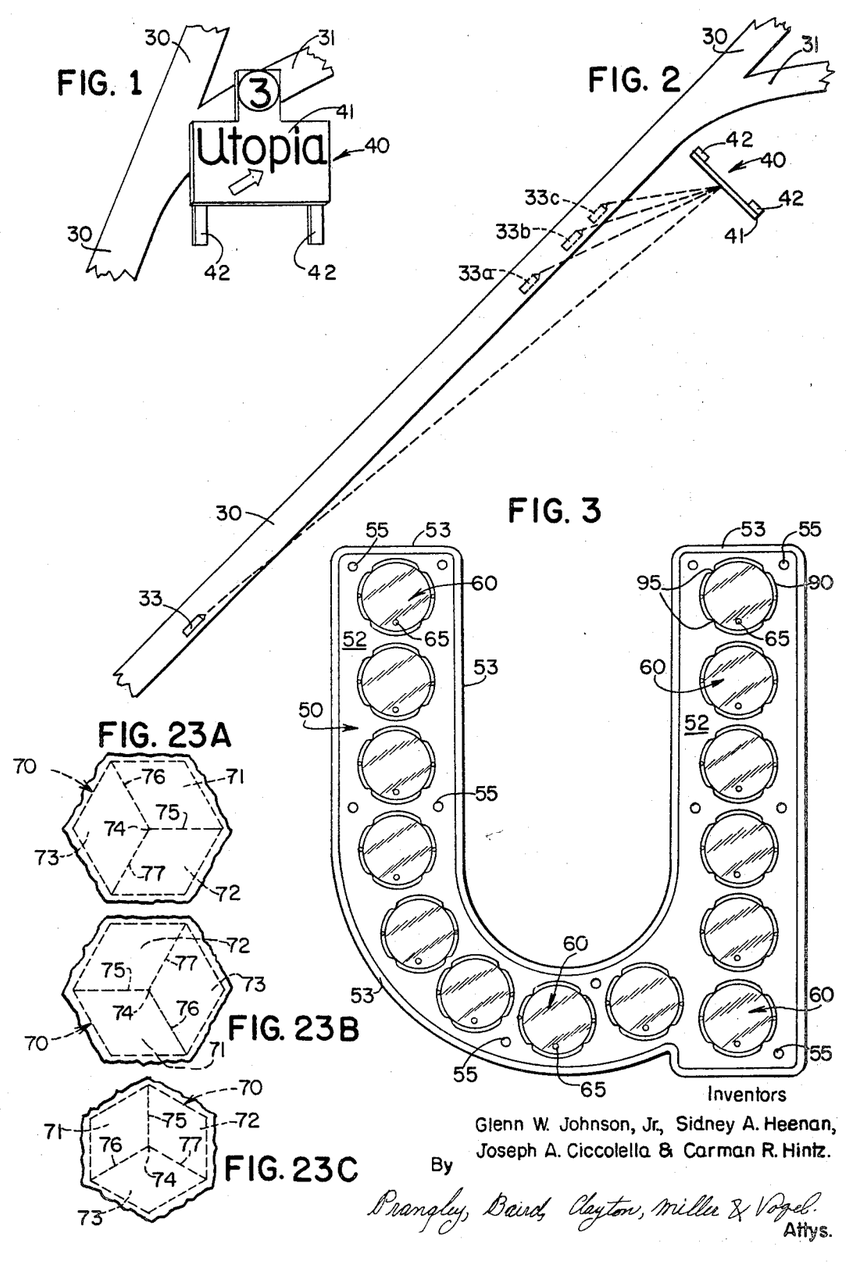
FIGURE 1 is a diagrammatic view illustrating a junction in a road and a sign mounted adjacent thereto and utilizing therein indicia made in accordance with and incorporating therein the principles of the present invention.
FIG. 2 is a diagrammatic plan view of the road intersection of FIG. 1 and illustrating the relationship between the sign therein and an approaching car at several positions on the road during the travel of the car toward the sign.
FIG. 3 is an enlarged plan view of one of the letters forming a part of the sign of FIGS. 1 and 2.
FIG. 23A is a diagrammatic view similar to FIG. 21A illustrating the orientation of a cube corner reflector for use with a sign on the right-hand side of a roadway.
FIG. 23B is a diagrammatic view similar to FIG. 23A illustrating the orientation of a cube corner reflector for use with a sign on the left-hand side of a roadway.
FIG. 23C is a diagrammatic view similar to FIG. 23A illustrating the orientation of a cube corner reflector for use with a sign in an elevated position above the roadway.

There is illustrated in FIGS. 1 and 2 of the drawings a typical intersection in a road and a sign disposed thereat for the directing of the drivers of vehicles moving along the road, the sign being composed of indicia made in accordance with and embodying the principles of the present invention. More specifically, there is illustrated a road 30 directed generally upwardly and to the right and intersecting a second road 31 joining the road 30 at approximately a 45° angle and directed to the right. Disposed at the intersection between the roads 30 and 31 is a sign 40 including a support 41, made for example of plywood, and mounted upon a pair of posts 42 and extending downwardly into the ground to maintain the support 41 at a predetermined level with respect to the road 30. Mounted on the support 41 in turn are the reflectorized letters U, t, o, p, i and a; the reflectorized numeral 3; a reflectorized circular border around the numeral 3; and a reflectorized arrow pointing in the direction of the road 31.

There is illustrated in FIG. 3 of the drawings the letter U from the sign 40 of FIGS. 1 and 2, the letter U being made in accordance with and embodying the principles of the present invention and being illustrative of the type of indicia to which the present invention is applicable. As illustrated, the letter U includes a body 50 in the general shape of the letter and having a plurality of reflector receiving openings 51 therein, see FIG. 5 also, in each of which is disposed a reflector generally designated by the numeral 60, the reflector receiving openings 51 and the associated reflectors 60 also being arranged in the general shape of the letter U so that when the letter U is lighted only by the reflected light from the reflectors 60 the identity thereof is clear.

The body 50 may be formed of any suitable material, but preferably is formed of metal, the preferred metal being aluminum. In a typical construction, the surfaces of the aluminum body 50 are anodized and the front surface thereof coated with an enamel or other protective and decorative coating, it being understood that the front surface of the body 50 is provided with a protective coating that is decorative, wear resistant and weather resistant. The central portion or area of the body 50 is formed substantially flat as at 52 and it is in the flat area 52 that the reflector receiving openings 51 are provided. Formed integral with the flat area 52 and extending around the entire periphery of the letter U is a rearwardly directed flange 53 that extends rearwardly beyond the rear surface of the associated reflectors 60 and terminates at an edge 54 which is adapted to be disposed against the associated support 41 of the sign 40. A plurality of fastener receiving holes 55 is provided in the body 50 around the periphery thereof but spaced inwardly from the flange 53 for receiving therethrough fasteners such as nails, screws, and the like (not shown), for the purpose of mounting the letter U upon the support 41 of the sign 40.

Figure 4:
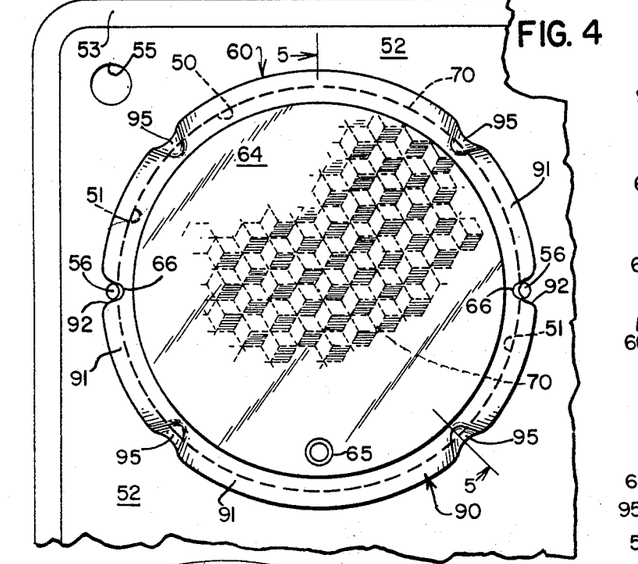
FIG. 4 is a further enlarged fragmentary plan view of a portion of the letter of FIG. 3 and illustrating the mounting of a reflector thereon.

Referring more particularly to the FIGS. 4–8 and 11 of the drawings, there are illustrated the details of one of the reflectors 60 and the mounting thereof upon the body 50. The reflector 60 includes an annular side wall 61 that is fundamentally shaped as a section of a cone, the inclination of the wall 61 being somewhat exaggerated in the drawings for illustrative purposes. A horizontal cross section through the side wall 61 is circular and the maximum external diameter thereof is slightly less than the diameter of the associated opening 51 so that even after mounting upon the body 50, the reflector 60 is only loosely trapped thereon and is free to move within the opening 51. Formed integral on the rearward portion (to the right as viewed in FIG. 5) of the side wall 61 is an outwardly directed flange 62 which extends completely around the periphery of the side wall 61 and extends outwardly beyond the edges of the associated opening 51, i.e., the outer periphery of the retaining flange 62 is circular in shape and has a diameter substantially larger than the diameter of the opening 51. The forward portion of the side wall 61 (to the left as viewed in FIG. 5) carries a front wall 63, the front wall 63 completely closing the front of the side wall 61 and being generally circular in shape as is best seen in FIG. 4. The front surface 64 of the front wall 63 is formed slightly curved as illustrated and is directed toward the source of incident light when the reflector 60 mounted on the body 50 is in the operative position thereof. Formed on the rear of the front wall 63 are reflecting elements 70, the reflecting elements 70 being of the cube corner type and substantially completely filling the rear surface of the front wall 63. There further is formed integral with the front wall 63 and extending outwardly therefrom a generally conical shaped orientation tab 65, the purpose and function of which will be described more fully hereinafter. The rear of the side wall 61 is completely closed by a back sheet 80 substantially circular in shape and having an outer diameter greater than the inner diameter of the retaining flange 62. Preferably the back sheet 80 is secured to the side wall 61 and more specifically is sealed thereto around the entire periphery thereof by means of an ultrasonic weld, as will be explained more fully hereinafter, the weld being indicated by the numeral 81.

Figure 11:
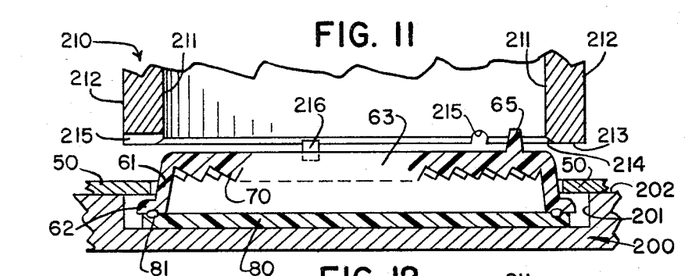
FIG. 11 is a schematic diagram in vertical section illustrating at the same point as section 5—5 the position of the reflector with respect to the body and with respect to an ultrasonic swedging tool prior to the mounting of the reflector on the body.

Prior to the mounting of the reflector 60 on the associated body 50, the cross section of the reflector 60 is like that illustrated in FIG. 11 of the drawings, i.e., the outer surface of the side wall 61 extends upwardly and is joined directly to the front surface 64 of the front wall 63. Furthermore, the side wall 61, the retaining flange 62, the front wall 63, and the orientation tab 65 are all formed integral and as one piece, and preferably are formed by molding a mass of a suitable synthetic organic plastic resin, the preferred plastic resin being a methacrylate resin such as a methyl methacrylate resin. In the process of mounting the reflector 60 upon the body 50, a portion of the material from the side wall 61 is swedged therefrom after ultrasonic heating thereof to form a front flange 90 on the side wall 61 extending outwardly therefrom, the method of forming the front flange 90 to be described more fully hereinafter. As illustrated in FIGS. 4–8 the front flange 90 extends completely around the outer periphery of the side wall 61 and outwardly beyond the edge of the associated reflector opening 51; the front flange 90 comprises four equiangularly disposed relatively thinner and relatively wider flange portions 91 and four equiangularly disposed and spaced apart relatively thicker and relatively narrower flange portions 95.

Figure 5:
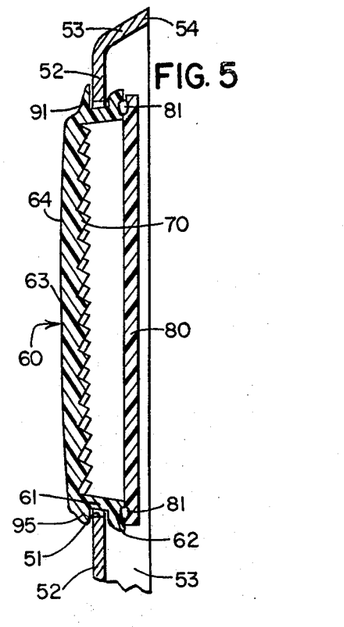
FIG. 5 is a view in section through the portion of the sign in FIG. 4 along the line 5—5 thereof.
Figure 6:
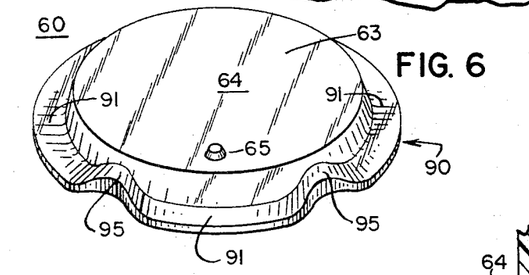
FIG. 6 is a perspective view of the portion of the reflector disposed above the associated body in FIG. 4.
Figure 7:
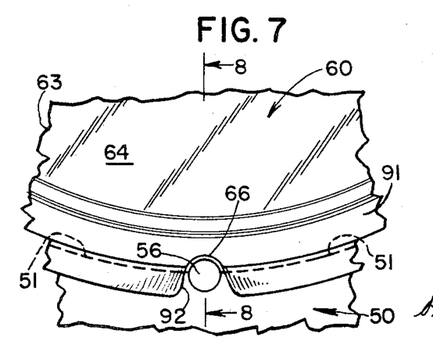
FIG. 7 is a still further enlarged fragmentary plan view of the projection and groove connection between the reflector and the body illustrated in FIG. 4.
Figure 8:
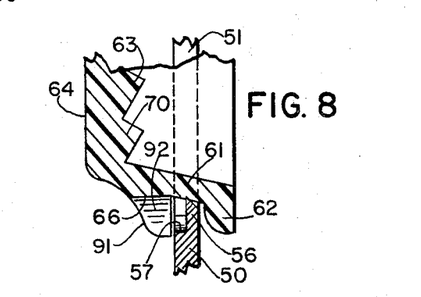
FIG. 8 is a view in vertical section through the assembly of FIG. 7 along the line 8—8 thereof.

By referring specifically to FIGS. 5 and 8, it will be seen that the distance between the facing surfaces on the retaining flange 62 and the front flange 90 is preferably greater than the thickness of the associated body 50, and specifically the area thereof around the reflector receiving opening 51, whereby the retaining flange 62 and the front flange 90 serve to mount the reflector 90 upon the body 50 with clearance therebetween in a loose and trapped condition, it being possible, for example, manually to position the reflector 60 with respect to the body 50 so that neither the outer periphery of the annular side wall 61 nor the surfaces of the retaining flange 62 and the front flange 90 touch the body. This latter feature is of particular importance when the sign 40 is to be mounted in areas in which the temperature changes substantially, since the metal body 50 undergoes substantial dimensional changes about the openings 51 due to thermal expansion and contraction thereof. It is desirable that such thermal expansion and contraction not be transmitted to the reflector 60, since the reflecting elements 70 are highly sensitive to dimensions changes, whereby if the changes in dimensions of the body 50 were transmitted to the reflector 60, the reflecting properties thereof could be substantially diminished, distorted, or actually destroyed. By using the clearances noted and the loose and trapped mounting illustrated in FIGS. 4–8, it is possible to mount the reflector 60 on the body 50 in a substantially permanent manner but without imparting any adverse distortion to the reflector 60 upon the thermal expansion and contraction of the body 50.

As will be explained more fully hereinafter, it is highly desirable to orient all of the reflecting elements 70 on each reflector 60 in a predetermined manner, and further to orient all of the reflectors 60 in a predetermined manner with respect to the body 50, and specifically to provide a specific orientation of the reflectors 60 about the optical axes thereof, the optical axis of each reflector 60 being substantially perpendicular to the front wall 63 and in the geometrical center thereof. The mounting structure described above including the retaining flange 62 and the front flange 90 with no additional structure would permit the reflectors 60 to be freely rotated or spun about their optical axes and with respect to the body 50. In order to maintain a predetermined orientation of the reflector 60 with respect to the body 50, orientation structure is provided, the details of which are most fully illustrated in FIGS. 7 and 8 of the drawings. There is formed on the periphery of the opening 51 a pair of inwardly extending projections 56 that are formed from the material surrounding the openings 51 by swedging material such as from the recess 57 outwardly toward the other side of the opening 51. As is seen in FIG. 4, two of the projections 56 are provided on opposite ends of a diameter of the opening 51. The projections 56 cooperate with complementarily shaped grooves 66 formed in the side wall 61 of the reflector 60, the grooves 66 being positioned substantially at the midpoints respectively of two opposed flange sections 91, whereby the flange sections 91 associated with the grooves 66 have substantially U-shaped indentations 92 therein. It will be noted that the projections 56 extend to and engage the side wall 61 in the grooves 66 and may have the outer ends thereof embedded therein. The cooperating projections 56 and the grooves 66 positively prevent rotation of the reflector 60 about its optical axis with respect to the body 50 so as to preserve the orientation of the reflecting elements 70 thereof with respect to the body 50.

Figures 9, 10:
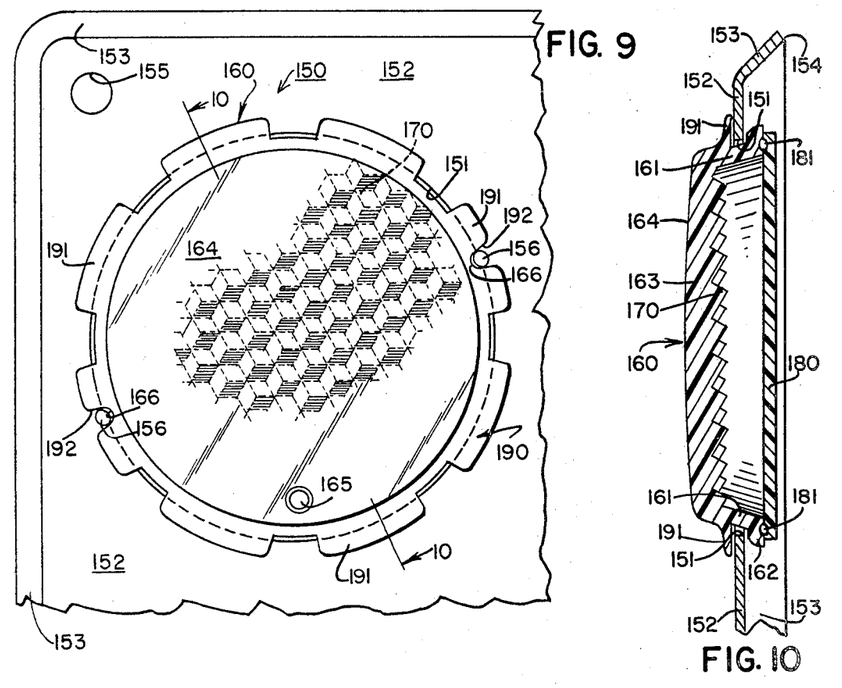
FIG. 9 is a view similar to FIG. 4 and illustrating a modification of the mounting of the reflector on the associated body.
FIG. 10 is a view in section through the assembly of FIG. 9 along the line 10—10 thereof.

There is illustrated in FIGS. 9 and 10 of the drawings a second embodiment of the invention, like parts in FIGS. 9 and 10 having been given the same reference numerals in the 100 series as the corresponding parts in the form of the invention illustrated in FIGS. 4–8 of the drawings. The indicia illustrated in FIGS. 9 and 10 includes a body 150 having a reflector receiving opening 151 therein disposed in a substantially flat area 152 thereon, a rearwardly directed flange 153 terminating in a rear edge 154 extending around the flat area 152, there being also provided an opening 155 therein for mounting the body 150 upon an associated support. The reflector 160 includes an annular side wall 161 of generally circular shape and having an outer diameter less than the inner diameter of the body opening 151 so as loosely to fit therein. The rearward portion of the side wall 161 carries an outwardly extending flange 162 having an outer diameter greater than the diameter of the body opening 151 and the forward portion of the side wall 161 carries a front wall 163 completely closing the forward portion thereof and having a forwardly directed front surface 164 on the front thereof and a plurality of cube corner reflecting elements 170 on the rear surface thereof. The rear of the reflector 160 is closed by a rear plate 180 that is circular in shape and has a diameter greater than the internal diameter of the side wall 161 but slightly less than the diameter of the retaining flange 162 and preferably secured to the side wall 161 by an ultrasonic weld as at 181.

In order loosely to trap and mount the reflector 160 upon the body 150, an outwardly directed flange 190 is provided, the flange 190 including 8 spaced apart flange sections 191 equiangularly positioned around the periphery of the side wall 161 and integral therewith. Each of the flange sections 191 extends outwardly beyond the adjacent edge of the body opening 151 and overlies the front surface of the flat area 152 and in cooperation with the flange 162 serving loosely to retain the reflector 160 upon the body 150. The preferred manner of forming the flange 190 is by ultrasonic heating of the material of the side wall 161 and a subsequent swedging thereof into the shape illustrated, all of the flange sections 191 being of the same cross sectional configuration and having the same radial extent.

The reflector 160 is also oriented in a predetermined manner with respect to the body 150; to assist in the assembly of the reflector 160 in this manner, the front wall 163 carries an outwardly directed orientation tab 165 thereon. All of the cube corner reflecting elements 170 are oriented in the same direction upon the front wall 163 and substantially cover the rear surface thereof. In order to maintain the orientation of the reflecting elements 170 in the optimum position upon the body 150, orientation structure is provided in the form of diametrically disposed projections 156 extruded from the material defining the periphery of the opening 151 and extending radially inwardly toward each other. The projections 156 are received in complementarily shaped grooves 166 in the side wall 161, the grooves 166 being disposed substantially centrally of associated front flange sections 191, whereby U-shaped indentations 192 are formed in the respective flange sections 191. The cooperating projections 156 on the body 150 and the grooves 166 on the reflector 160 serve to maintain the desired orientation of the reflector 160 and the cube corner reflecting elements 170 thereon with respect to the body 150. Although eight of the flange sections 191 have been illustrated in FIG. 9 of the drawings, any desired number from 2 to 8 or more may be provided, it being understood, however, that the indentations 192 are always provided in two opposed flanges to accommodate the grooves 166 and cooperating projections 156.

There is illustrated in FIGS. 11–15 the method by which a typical reflector 60 is mounted upon the associated body 50. Referring first to FIG. 11 there is illustrated diagrammatically a fixture 200 having a circular recess 201 therein for receiving a reflector 60, it being understood that the reflector 60 at this stage of the construction of the letter has no flange 90 thereon. The diameter of the recess 201 is slightly greater than the outer diameter of the retaining flange 62 so as readily to receive the reflector 60 therein, care being taken when placing the reflector 60 in the recess 201 to orient the reflector about its optical axis in a predetermined position utilizing the orientation tab 65. The fixture 200 has a substantially flat upper surface 202 about the recess 201 for supporting the body 50 thereon, the vertical extent of the recess 201 being greater than the distance between the rear surface of the back sheet 80 and the front surface of the retaining flange 62 so that the bottom surface of the flat area 52 is maintained spaced from the upper or front surface of the retaining flange 62.

Mounted above the fixture 200 for vertical reciprocating movement with respect thereto is an ultrasonic head 210 which is annular in shape and has an inner upstanding cylindrical wall 211 and an outer upstanding cylindrical wall 212, the lower end of the head 210 having a substantially flat surface 213 disposed normal to the walls 211 and 212 and being provided on the inner edge thereof with a beveled surface 214. Disposed about the lower end of the head 210 are four spaced apart and equiangularly positioned semi cylindrical recesses 215 having the axes thereof aligned with a diameter of the head 210. Also mounted on the lower end of the head 210 are two projection and groove forming pins 216, the two pins 216 being disposed at the opposite ends of a diameter of the head 210 and spaced equidistantly from the adjacent recesses 215. The diameter of the inner surface 211 is 99% of the outer diameter of the side wall 61 so that the inner wall 211 overlies a portion of the material forming the side wall 61 as does the beveled surface 214 and portions of the recesses 215. In the use of the head 210, a portion of the material of the side wall 60 is heated and swedged outwardly to form the flange 90. In order to provide sufficient material to provide the flange 90 and to insure the proper spacing between the retaining flange 62 and the flange 90, it is necessary that the distance between the front surface of the flange 62 and the front surface 64 of the front wall 63 be at least 2.1 times the thickness of the body 50 adjacent to the opening 51 therein.

Figure 12:
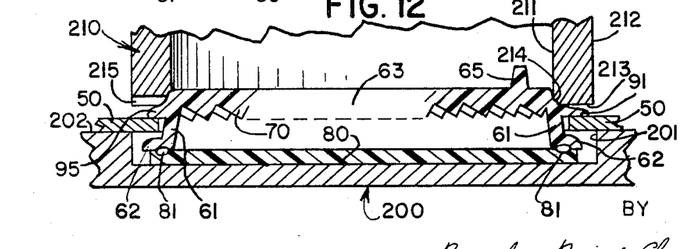
FIG. 12 is a view similar to FIG. 11 showing the position of the parts after the staking of the reflector onto the body.

The head 210 is mounted for vertical reciprocation between the position illustrated in FIG. 11 and that illustrated in FIG. 12 and further is suitably coupled to a source of ultrasonic energy, the preferred frequency of the source being approximately 20,000 cycles per second. The application of the ultrasonic energy to the material forming the side wall 61 upon the contact of the head 210 therewith causes the material to soften, the ultrasonic energy being transmitted into the plastic material and causing heating thereof by internal vibration, whereby there is a deep heating and softening of the plastic material forming the side wall 61 so that substantial bodies thereof can be displaced outwardly upon subsequent lowering of the head 210 to form the flange 90 between the lower end of the head 210 and the upper surface of the body 50, the heated material from the side wall 61 being swedged into the shape of the flange 90 illustrated. Along those portions of the lower end of the head 210 at which only the bottom surface 213 and the beveled surface 214 are present, the flange sections 91 are formed, and in those portions of the lower end of the head 210 in the recesses 215 are provided, the flange sections 95 are formed. It will be noted from FIG. 12 that the inner surface 211 has a diameter substantially greater than the internal diameter of the side wall 61 so as to insure that there will be no breaks or holes formed therein. The displaced and swedged material between the surface 213 and the upper surface of the body 50 is formed into the relatively wide and relatively thin flange sections 91. The material between the recesses 215 and the upper surface of the body 50 is formed into the relatively narrow and relatively thick flange sections 95, the configuration of the flange sections being exaggerated and diagrammatically illustrated in FIG. 6 of the drawings. Positive stop mechanism (not shown), is provided to limit the downward movement of the head 210 to the position illustrated in FIG. 12 so as to insure that the front flange 90 is formed as illustrated and described herein.

The number and size of the recesses 215 in the head 210 and the resultant number of the flange sections in the front flange 90 is preferably varied in accordance with the size of the reflectors 60, and specifically the diameter of the side walls 61 thereof. Four of the recesses 215 are provided in the small and medium sizes of reflectors, i.e., from ½ inch up to one inch diameter of the side wall 61; eight of the recesses 215 are provided in the next largest sizes of reflectors, i.e., from one inch up to about 3 inches diameter of the side wall 61; and twelve of the recesses 215 are provided in the largest sizes of reflectors, i.e., 3 inches or greater diameter of the side wall 61.

Figure 13:
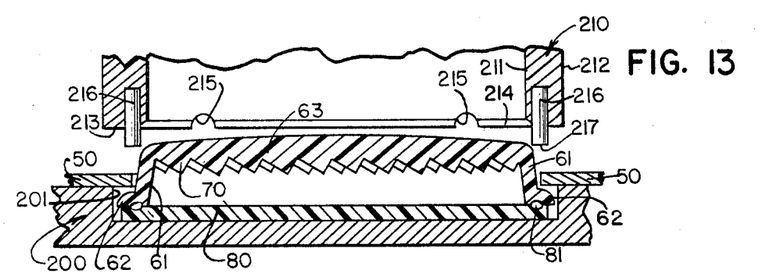
FIG. 13 is a view similar to FIG. 11 but showing the parts in section through the pins that form the cooperating projections and grooves on the assembled letter.
Figures 14, 15, 16:
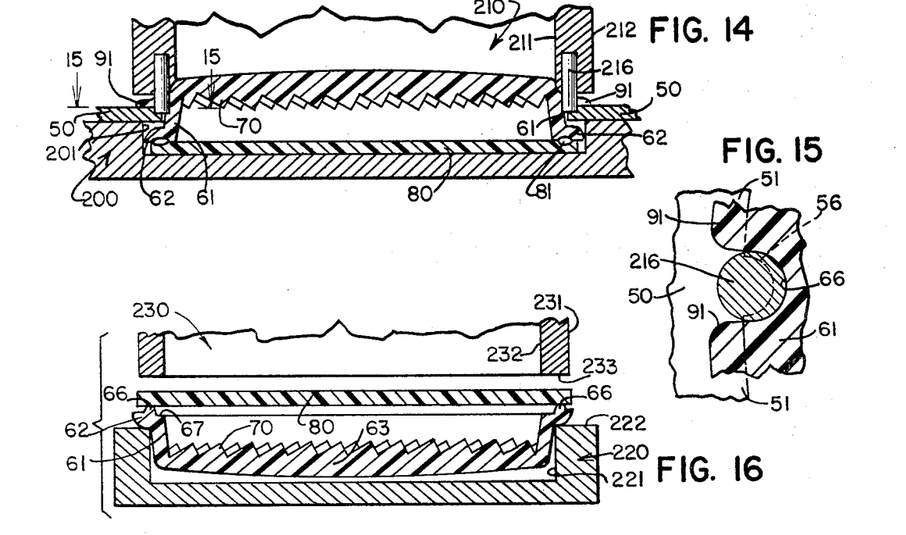
FIG. 14 is a view similar to FIG. 13 showing the position of the parts after the staking of the reflector onto the body and the formation of the cooperating projections and grooves.
FIG. 15 is an enlarged fragmentary view in horizontal section along the line 15—15 of FIG. 14.
FIG. 16 is a schematic diagram in vertical section along a diameter of the reflector and illustrating the position of the back sheet with respect to the reflector retaining flange prior to the sealing thereof.

Referring specifically to FIGS. 13 and 14 of the drawings, the formation of the cooperating projections and grooves is illustrated, the section through the head 210 being taken through the pins 216 that serve to form the projections 56 and the grooves 66. The pins 216 are preferably positioned with the axes thereof disposed outwardly from the adjacent portion of the inner surface 211, and when so positioned each of the pins 216 contacts both a portion of the plastic material of the side wall 61 and a portion of the material of the body 50 about the opening 51 therein. The movement of the head 210 from the position illustrated in FIG. 13 to that illustrated in FIG. 14 serves to push the pins 216 through the heated plastic material of the side walls 61 to form the grooves 66 therein, and just before the head 210 reaches the lowermost point of travel thereof, the bottom ends 217 of the pins 216 strike the upper surface of the body 50 and extrude inwardly therefrom the projections 56. There is illustrated in FIG. 15 of the drawings the relationship between a pin 216, the projection 56 formed thereby from the body 50 and the grooves 66 formed thereby in the side wall 61. It is further pointed out that the material forming the flange section 91 disposed on either side of the grooves 66 must flow around the pin 216, and accordingly, the space occupied by the pin 216 serves to form the U-shaped recess 92 in the flange section 91.

The frequency of the ultrasonic energy utilized in forming the flange 90 is preferably in the range from about 19,000 to about 20,000 cycles per second when the side wall 61 is formed of methyl methacrylate resin, the ultrasonic energy being applied for a period of time from about 0.3 second to about 1.2 seconds or longer, the head 210 being urged against the assembly of the reflectors 60 with the body 50 with a force of from about 60 to about 70 pounds. The duration of the application of the ultrasonic energy to the reflector is varied in accordance with the size of the reflector and specifically the diameter of the side wall 61 thereof. The ultrasonic energy is applied for 0.3 second when the diameter of the side wall is ½ inch, 0.4 second when ¾ inch, 0.6 second when ⅞ inch, 0.8 second when 1¼ inches and 1.2 seconds when 1⅝ inches.

Figure 17:
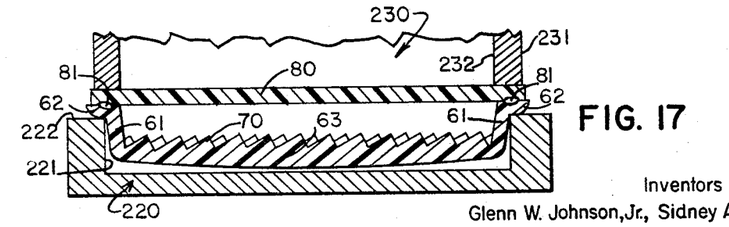
FIG. 17 is a view similar to FIG. 16 showing the position of the parts after the formation of the ultrasonic weld between the back sheet and the reflector retaining flange.

There is diagrammatically illustrated in FIGS. 16 and 17 of the drawings the method of forming the ultrasonic weld between the back sheet 80 and the side wall 61. There is provided a fixture 220 having a cylindrical recess 221 therein having a diameter slightly greater than the external diameter of the side wall 61 to receive the side wall 61 therein in the inverted position illustrated in FIG. 16. An upper surface 222 is provided on the fixture 220 around the opening 221 and arranged to support the front surface of the retaining flange 62. It further will be noted from FIG. 16 that the rear surface of the retaining flange 62 has a rearwardly directed projection 66 thereon, the projection 66 being in the form of a truncated pyramid and extending completely around the retaining flange 62 but spaced inwardly from the outer edge thereof. The inner edge of the projection 66 is also spaced outwardly from the inner surface of the side wall 61 and a recess 67 is provided therebetween and spaced forwardly with respect to the radially disposed outer rear surface of the retaining flange 62. In the process, the back sheet 80 is placed upon the projection 66, the diameter of the back sheet 80 being greater than the outer diameter of the projection 66 but less than the outer diameter of the retaining flange 62.

Mounted above the fixture 20 is an ultrasonic welding head 230 that is mounted for reciprocal movement above the fixture 220 between the positions illustrated in FIGS. 16 and 17. The welding head 230 is generally annular in form and has a cylindrical outer surface 231 having a diameter slightly less than the diameter of the back sheet 80 and an inner surface 232 having a diameter slightly less than the inner diameter of the projection 66 so that the entire projection 66 is disposed below a contacting surface 233 formed on the lower end of the welding head 230. The welding head 230 is further coupled to a source of ultrasonic energy, preferably at a frequency of approximately 20,000 cycles per second, whereby when the welding head 230 is lowered to the position illustrated in FIG. 17, the ultrasonic energy is applied from the welding head 230 through the back sheet 80 and to the interface between the back sheet 80 and the projection 66. The ultrasonic energy serves to heat the material of the back sheet 80 and the projection 66 at the interface therebetween to cause a melting and ultimate fusion thereof to provide the ultrasonic weld 81 completely around the periphery of the back sheet 80 and the side wall 61 and the retaining flange 62. The ultrasonic weld 81 serves hermetically to seal the rear of the reflector 60 and thus to prevent entry of dust, water, or other debris thereinto so as to prevent deposition thereof on the light reflecting surfaces of the cube corner elements 70.

As has been noted above, it is desired to orient the cube corner reflecting elements 70 in a predetermined manner on the reflector 60 and on the body 50 in the sign 40 so as to obtain therefrom a maximum reflected signal for a given intensity of incident light thereon. It has been found that the maximum signal is obtained if the cube corner reflecting elements are "edge oriented," i.e., oriented so that the light entering the cube corner reflecting element is directed toward an edge joining two of the three intersecting planar reflecting surfaces forming the reflecting element. Referring to FIGS. 18–23 of the drawings, there is illustrated therein the manner in which the cube corner reflecting elements must be oriented and an explanation as to why the preferred orientation provides a stronger reflected signal for a given intensity of light thereon.

Figures 18, 19, 20, 21A, 21B, 21C:
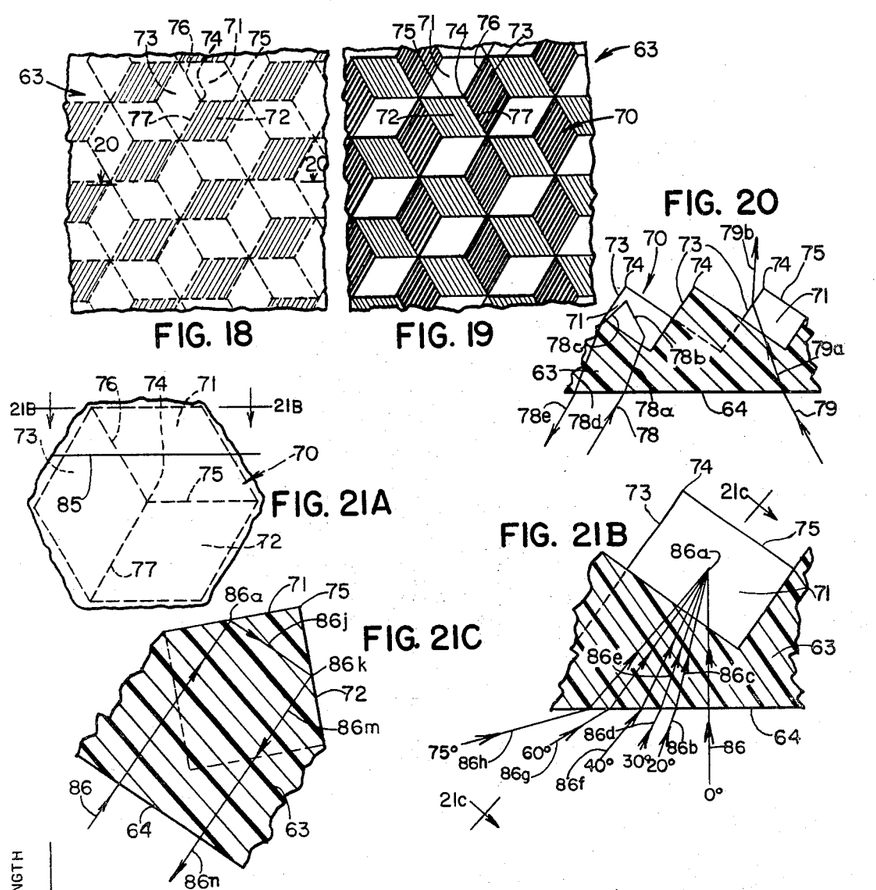
FIG. 18 is an enlarged fragmentary plan view of a portion of the face of the reflector of FIG. 4 and illustrating specifically the orientation of the cube corner reflecting elements thereon.
FIG. 19 is a plan view of the rear of the front wall of the reflector of FIG. 4 and showing in elevation the cube corner reflecting elements thereon.
FIG. 20 is a view in horizontal section along the line 20—20 of FIG. 18.
FIG. 21A is a further enlarged plan view of a portion of the face of the reflector and illustrating a single cube corner reflecting element thereof.
FIG. 21B is a view in horizontal section along the line 21B—21B of FIG. 21A.
FIG. 21C is a view in section through the cube corner reflecting element of FIG. 21B along the line 21C—21C thereof.

Referring first to FIGS. 2, 4 and 18 it is pointed out that the sign illustrated therein is intended for use on the right-hand side of a road with the incident light from a vehicle such as the automobile 33 being directed to the right from the automobile 33 and entering the reflecting elements on the sign 40 from the left thereof. For such a sign, the reflector 60 should have all of the reflecting elements 70 in the reflector 60 thereof oriented as illustrated in FIG. 4, i.e., with an edge formed by the intersection of two of the reflecting surfaces extending substantially horizontally from the apex of the cube forwardly and to the right, all of the cube corner reflectors 70 in the reflector 60 being oriented in this manner. There is illustrated in FIG. 18 of the drawings a portion of the face of the reflector 60 therein, FIG. 18 being drawn on a substantially enlarged scale whereby it will be seen that each of the cube corner reflectors 70 includes three reflecting surfaces 71, 72 and 73 that are arranged mutually perpendicular one to the other and all intersect at a rearward disposed common point or apex 74. As illustrated, the surfaces 71 and 72 intersect along a line 75 that extends from the apex 74 in a horizontal direction forwardly and to the right; the surfaces 71 and 73 intersect along a line 76 that extends from the apex 74 upwardly and forwardly to the left; and the surfaces 72 and 73 intersect along a line 77 extending from the apex 74 downwardly and forwardly to the left. FIG. 19 is a plan view of the rear surface containing the cube corner reflectors 70 and FIG. 20 is a view in horizontal section along the line 20—20 of FIG. 18. As is illustrated in FIG 20, a ray of light from an approaching vehicle such as the ray 78 enters the reflector through the surface 64 and is refracted within the reflector as at 78a and thereafter strikes, for example, the face 72, and is reflected therefrom along the path 78b, and thereafter strikes the face 71 and is reflected therefrom along the path 78c, after which it strikes the face 73 and is reflected therefrom along the path 78d, and upon leaving through the surface 64 is again refracted and leaves along the path 78e, the path 78e being substantially parallel to the path of the entering ray 78. By contrast, a ray entering the reflector from the right, such as the ray 79, is refracted at the face 64 and thereafter travels along the path 79a and strikes the face 73 at an angle such that the ray passes therethrough after refraction and exits as at 79b, whereby the incident ray 79 is lost through the back of the reflector.

FIGS. 21A, 21B and 21C are further enlargements of a single cube corner reflector 70. There is diagrammatically represented in FIG. 21A a plane perpendicular to the face 73 and disposed horizontally, the plane being represented by the line 85 lying therein. There is illustrated in FIG. 21B the effect of changing the angle of incidence of the light rays upon the face 64, all the light rays being disposed in the plane designated by the line 85 in FIG. 21A. More specifically, a ray 86 entering at an angle of incidence of 0° is not refracted at the surface 64 and passes through the material of the front wall 63 and strikes the surface 71 at the point designated 86a to be reflected therefrom toward the surface 72. A ray 86b falling upon the surface 64 at an angle of incidence of 20° is refracted at the surface 64 along the path 86c and also strikes the point 86a on the surface 71 and is reflected toward the surface 72. Another light ray 86d striking the surface 63 at an angle of incidence of 30° is also refracted and travels along the path 86e to strike the point 86a on the surface 71 to be reflected toward the surface 72. Additional light rays 86f, 86g, and 86h striking the surface 64 at angles of incidence of 40°, 60° and 75°, respectively, likewise are refracted and directed to the point 86a on the surface 71 and are reflected therefrom toward the surface 72. As illustrated in FIG. 21C which is a section in the plane represented by the line 85 and in which fall all of the light rays 86, 86b, 86d, 86f, 86g and 86h, all of the entering light rays illustrated in FIG. 21B travel along the line collectively designated 86 in FIG. 21C and strike the point 86a on the face 71 and are reflected therefrom along the path 86j and strike a point 86k on the face 72 and are reflected therefrom along the path 86m to emerge from the face 63 as a ray 86n directed toward the source of the light ray 86. Accordingly, it will be seen from a consideration of FIGS. 21A, 21B and 21C that the orientation of the edge 75 horizontally and forwardly to the right is effective in giving maximum reflection of light rays incident on the two surfaces intersecting thereat.

Figure 22:
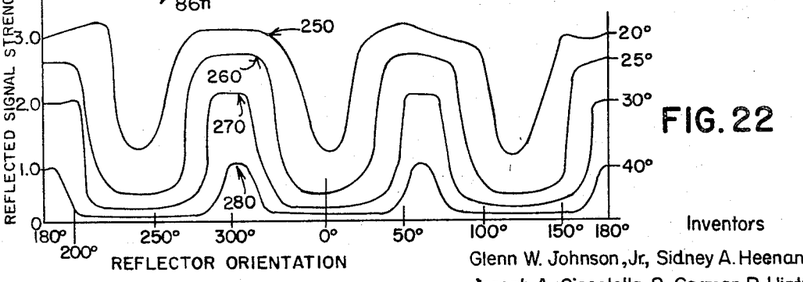
FIG. 22 is a graph illustrating the relationship between the intensity of the light reflected from a reflector of the present invention as measured for different orientations of the cube corner reflecting elements thereof about the optical axis thereof and for different angles between the face of the reflector and the incident ray of light.

The effect on the strength of the reflected signal of rotating the reflector 60 about its optical axis is illustrated by the graphs of FIG. 22. More specifically, there is illustrated by the curve 250 the reflected signal strength when the angle of incidence is 20°, for example when the car 33 is at the position 33a in FIG. 2 with respect to the sign 40. The reflector orientation of 0° refers to an orientation of the reflector 60 when the edge 76 in FIG. 21A is oriented horizontally, i.e., when the reflector 70 is oriented as illustrated in FIG. 23B of the drawings; the reflector orientation is 60° when the cube corner reflector 70 is in the position illustrated in FIGS. 21A and 23A; and the reflector orientation is 90° when the cube corner reflector 70 is in the position illustrated in FIG. 23C; and other reflector orientation angles are computed in a like manner, i.e., by measuring the angle between the rotated edge 76 and the position of the edge 76 illustrated in FIG. 23B of the drawings. It also will be seen that in a cube corner reflector, orientations 120° apart should give identical values for the reflected signal strength, whereby in the curve 250 there are signal strength minima at reflector orientation angles of 0°, 120° and 240°, respectively; likewise, there are reflector signal strength maxima at 60°, 180° and 300°, respectively. The effects of changing the angle of incidence of 20° to 25°, 30° and 40° are plotted respectively on the curves 260, 270 and 280, the 30° position of the automobile 33 being illustrated at 33b in FIG. 2 and the position of the automobile 33 at a 40° position being illustrated at 33c in FIG. 2. In general the points of minima and maxima on the curves 260, 270 and 280 correspond to the points of minima and maxima on the curve 250 discussed in detail above, whereby it will be seen that a maximum reflected signal strength is achieved when the cube corner reflectors 70 are edge oriented with respect to the incident ray of light, i.e., the ray is directed generally at the edge between a pair of intersecting reflecting surfaces.

There is illustrated in FIGS. 23A, 23B and 23C the preferred positions, namely, the "edge oriented" position of the cube corner reflector 70 for signs located to the right of the roadway, the left of the roadway and at an elevated position above the roadway, respectively. More specifically, it will be seen from FIG. 23A, which is identical to FIG. 21A, that when the reflector is positioned to the right of the road, the edge 75 between the two intersecting reflecting surfaces 71 and 72 toward which the incident ray is directed is disposed substantially horizontally and extends forwardly and to the right. It will be seen from FIG. 23B, that when the reflector is positioned to the left of the road, the edge 75 between the two intersecting reflecting surfaces 71 and 72 toward which the incident ray is directed is disposed substantially horizontally and extends forwardly and to the left. It will be seen from FIG. 23C, that when the reflector is in an elevated position above the roadway, the edge 75 between the two intersecting reflecting surfaces 71 and 72 toward which the incident ray is directed is directed upwardly and extends forwardly.

The following are the dimensions for a typical letter made in accordance with the form of the invention illustrated in FIGS. 8 and 9. The thickness of the body 50 is 0.040 inch; the length of the flange 153 is 0.20 inch; the diameter of the openings 151 is 1.304 inches. In the reflector 160, the diameter of the retaining flange 162 is 1.357 inches, the diameter of the side wall 161 at the intersection with the retaining flange 162 is 1.289 inches; the height of the side wall 161 at the edge is 0.10 inch; the height or thickness of the retaining flange 162 is 0.04 inch; the diameter of the base of the orientation tab 165 is 0.035 inch and the height thereof is 0.035 inch; the radial extent of the front flange 190 is 0.04 inch; distance between the adjacent faces of the retaining flange 162 and the front flange 190 is 0.042 inch; the outer diameter of the projection thereon corresponding to the projection 66 on the reflector 60 is 1.292 inches and the radial width thereof is 0.020 inch; the diameter of the back sheet 180 is 1.320 inches and the thickness thereof is 0.040 inch.

The head for mounting the reflector 160 on the body 150 is substantially like the head 210 but instead of having four of the recesses 215 around the periphery thereof, there are eight such recesses and the recesses are formed deeper, whereby the thicker flange portions 95 on the flange 90 are not formed on the flange 190. As has been explained above with respect to the reflector 60 and the head 210 therefor, the inside diameter of the head 210, i.e., the diameter of the surface 211, is 99% of the diameter of the side wall 161; the diameter of each of the pins 216 is 0.019 inch and the pin 216 projects downwardly below the surface 213 a distance such that when the head 210 reaches the position illustrated in FIG. 12, the lower end 217 of the pin 216 extends into the body 150 a distance of 0.02 inch, i.e., one-half of the thickness thereof.

In the reflectorized letter formed by mounting the reflectors 160 on the body 150, it is preferred that the maximum radial clearance between the outer surface of the side wall 161 and the edge of the opening 151 be 0.0075 inch, whereby a total or maximum diametrical clearance is provided of 0.015 inch. The clearance between the adjacent surfaces of the body 150 and the adjacent surfaces of the retaining flange 162 and the front flange 190 is in the range from about 0.001 inch to about 0.003 inch.

When constructed and dimensioned as described above, the assembly of the reflector 160 on the body 150 is strong. For example, it requires a force of at least 40 pounds to push the reflector rearwardly out of association with the body 150 by breaking the flanges 190. The orientation structure including the projections 156 and the grooves 166 will stand a torque of 0.5 inch-pounds around the optical axis without breaking. Accordingly, the reflectors 160 are strongly mounted upon the body 150 but are loosely held thereon so that the thermal changes in dimension of the body 150 will not be transmitted to the reflector 160.

From the above it will be seen that there have been provided reflectorized indicia and methods of making reflectorized indicia which fulfill all of the objects and advantages set forth above. While there have been described what are at present considered to be certain preferred embodiments of the invention, it will be seen that various modifications may be made therein, and it is intended to cover in the appended claims all such modifications as fall within the true spirit and scope of the invention.

We claim:

1. A reflectorized indicium comprising a body in the general shape of the indicium and having a plurality of reflector receiving openings therein arranged in the general shape of the indicium, a reflex reflector mounted in each of said openings in said body to provide an array of reflectors in the general shape of the indicium, each of said reflectors being formed integral and as one-piece of a synthetic organic plastic resin and each including an annular side wall having an outer periphery shaped complementary to the associated body opening, a front wall on the forward portion of said side wall integral therewith and closing the same and a plurality of reflector elements on the rear surface of said front wall, an outwardly directed retaining flange on the rearward portion of said side wall integral therewith and extending outwardly beyond the edge of the associated body opening to the rear of said body, and an outwardly directed front flange on the forward portion of said side wall integral therewith and extending outwardly beyond the edge of the associated front opening in front of said body, said retaining flanges and said front flanges cooperating to mount the associated integral one-piece reflectors in the respective reflector receiving openings in said body.

2. The reflectorized indicium set forth in claim 1, wherein said reflector elements are of the cube corner type.

3. The reflectorized indicium set forth in claim 1, wherein said front flange is swedged from said side wall.

4. The reflectorized indicium set forth in claim 1, wherein said front flange is continuous and extends around the entire periphery of said side wall and includes alternately arranged thicker portions of shorter radial extent and thinner portions of longer radial extent.

5. The reflectorized indicium set forth in claim 1, wherein said front flange includes a plurality of circumferentially spaced apart portions of substantially equal circumferential extent.

6. The reflectorized indicium set forth in claim 1, wherein said body has front and rear surfaces adjacent to the openings therein and spaced apart a first predetermined distance, the front surface of said retaining flange and the rear surface of said front flange are spaced apart a distance greater than said first predetermined distance, and the outer periphery of said side wall is spaced from the periphery of the associated reflector opening a second predetermined distance.

7. The reflectorized indicium set forth in claim 1, and further comprising a back sheet covering the rear of said side wall and sealed thereto around the periphery thereof.

8. The reflectorized indicium set forth in claim 7, wherein said back sheet is secured to said side wall by an ultrasonic weld.

9. A reflectorized indicium comprising a body in the general shape of the indicium and having a plurality of reflector receiving openings therein arranged in the general shape of the indicium, a reflex reflector mounted in each of said openings in said body to provide an array of reflectors in the general shape of the indicium, each of said reflectors being formed integral and as one-piece of a synthetic organic plastic resin and each including an annular side wall having an outer periphery shaped complementary to the associated body opening, a front wall on the forward portion of said side wall integral therewith and closing the same and a plurality of reflector elements on the rear surface of said front wall, an outwardly directed retaining flange on the rearward portion of said side wall integral therewith and extending outwardly beyond the edge of the associated body opening to the rear of said body, an outwardly directed front flange on the forward portion of said side wall integral therewith and extending outwardly beyond the edge of the associated front opening in front of said body, said retaining flanges and said front flanges cooperating to mount the associated integral one-piece reflectors in the respective reflector receiving openings in said body, and orientation structures on said body and said reflectors cooperating to maintain a predetermined orientation of said reflectors with respect to said body.

10. The reflectorized indicium set forth in claim 9, wherein said orientation structure includes cooperating projection and groove structures on said body and said reflectors serving to maintain a predetermined orientation of said reflectors with respect to said body.

11. The reflectorized indicium set forth in claim 9, wherein said orientation structure includes a projection on the periphery of each of said openings extending inwardly therefrom and toward the associated reflector side wall, and a groove in each of said side walls opposite the associated projection and extending substantially normal to said body and receiving said associated projection therein, said projections and said grooves cooperating to maintain a predetermined orientation of said reflectors with respect to said body.

12. A reflectorized indicium comprising a body in the general shape of the indicium and having a plurality of reflector receiving openings therein arranged in the general shape of the indicium, a reflex reflector mounted in each of said openings in said body to provide an array of reflectors in the general shape of the indicium, each of said reflectors being formed integral and as one-piece of a synthetic organic plastic resin and each including an annular side wall having an outer periphery shaped complementary to the associated body opening, a front wall on the forward portion of said side wall integral therewith and closing the same and a plurality of cube corner reflecting elements on the rear surface of said front wall all oriented in the same direction, an outwardly directed retaining flange on the rearward portion of said side wall integral therewith and extending outwardly beyond the edge of the associated body opening to the rear of said body, an outwardly directed front flange on the forward portion of said side wall integral therewith and extending outwardly beyond the edge of the associated front opening in front of said body, said retaining flanges and said front flanges cooperating to mount the associated integral one-piece reflectors in the respective reflector receiving openings in said body, and orientation structures on said body and said reflectors cooperating to maintain each of said reflectors in a predetermined orientation with respect to said body, each of said reflectors being edge oriented with respect to an incident ray of light when said reflectorized indicium is in the operative position thereof.

13. The reflectorized indicium set forth in claim 12, wherein said reflectorized indicium is designed for positioning to the right of the source of an incident ray of light when in use, and the edge of each of said cube corner reflecting elements in said reflectors toward which the incident ray is to be directed in use extending substantially horizontally outwardly and to the right from the apex of the associated cube corner reflecting element.

14. The reflectorized indicium set forth in claim 12, wherein said reflectorized indicium is designed for positioning to the left of the source of an incident ray of light when in use, the edge of each of said cube corner reflecting elements in said reflectors toward which the incident ray is to be directed in use extending substantially horizontally and outwardly to the left from the apex of the associated cube corner reflecting element.

15. The reflectorized indicium set forth in claim 12, wherein said reflectorized indicium is designed for positioning at an elevated point with respect to the source of an incident ray of light when in use, the edge of each of said cube corner reflecting elements in said reflectors toward which the incident ray is to be directed in use extending outwardly and upwardly from the apex of the associated cube corner reflecting element.

16. The reflectorized indicium set forth in claim 12, wherein each of said reflectors has an orientation tab on a forward portion thereof and having a predetermined position with respect to the cube corner reflecting elements thereon for use in orienting said reflectors with respect to said body during the assembly thereof.

References Cited
UNITED STATES PATENTS

| | | | |
|---|---|---|---|
| 2,175,566 | 10/1939 | Blackman et al. | 40—130 |
| 2,253,346 | 8/1941 | Patton | 88—78 |
| 2,278,025 | 3/1942 | Sadoski | 88—82 |
| 2,310,665 | 2/1943 | Williams | 40—130 |
| 2,317,162 | 4/1943 | Wood | 40—133 |
| 2,347,219 | 4/1944 | Schnell | 29—509 |
| 2,389,234 | 11/1945 | Harrison | 40—130 |
| 2,553,051 | 5/1951 | Kingman | 29—502 |
| 2,685,231 | 8/1954 | Onksen | 88—82 |
| 2,948,937 | 8/1960 | Rapata | 29—522 |
| 3,015,682 | 1/1962 | Cheske | 29—522 |
| 2,791,938 | 5/1957 | Doolittle et al. | 350—103 X |

LAWRENCE CHARLES, *Primary Examiner.*